United States Patent
Schuermann et al.

(10) Patent No.: US 7,871,051 B2
(45) Date of Patent: Jan. 18, 2011

(54) DOCUMENT HOLDER FOR CARTS

(75) Inventors: Amy Youngblood Schuermann, Cincinnati, OH (US); Brian Stier Schuermann, Cincinnati, OH (US); Anthony Honerkamp, Cincinnati, OH (US); Geoff Ficke, Warsaw, KY (US); Nancy Ficke, Warsaw, KY (US); Richard D. Harrington, Cincinnati, OH (US)

(73) Assignee: ABS Studio LLC, Cincinnati, OH (US)

( * ) Notice: Subject to any disclaimer, the term of this patent is extended or adjusted under 35 U.S.C. 154(b) by 14 days.

(21) Appl. No.: 12/237,922

(22) Filed: Sep. 25, 2008

(65) Prior Publication Data

US 2009/0084924 A1      Apr. 2, 2009

Related U.S. Application Data

(60) Provisional application No. 60/975,583, filed on Sep. 27, 2007, provisional application No. 61/078,996, filed on Jul. 8, 2008.

(51) Int. Cl.
*A47G 1/24* (2006.01)
(52) U.S. Cl. .................................................. 248/456
(58) Field of Classification Search .................. 248/452, 248/454, 456
See application file for complete search history.

(56) References Cited

U.S. PATENT DOCUMENTS

| | | | |
|---|---|---|---|
| 2,864,189 A * | 12/1958 | Campbell | 40/308 |
| 3,539,204 A | 11/1970 | Keller | |
| 3,881,267 A | 5/1975 | Hicks | |
| 4,274,567 A | 6/1981 | Sawyer | |
| 4,443,961 A * | 4/1984 | Gilroy | 40/308 |
| 4,535,963 A | 8/1985 | Lachonius | |
| 4,583,753 A * | 4/1986 | Economy | 280/33.992 |
| 4,622,767 A * | 11/1986 | Sullivan | 40/120 |
| 4,685,701 A | 8/1987 | Amundson et al. | |
| 4,848,117 A | 7/1989 | Welborn et al. | |

(Continued)

OTHER PUBLICATIONS

Internet Article: "MediaCart, Microsoft and Wakefern Team Up to Deliver Next-Generation Digital Grocery Shopping and Ad Experience", published Jan. 14, 2008, available at http://www.microsoft.com/presspass/press/2008/jan08/01-14WakefernPR.mspx.

*Primary Examiner*—Terrell Mckinnon
*Assistant Examiner*—Erin Smith
(74) *Attorney, Agent, or Firm*—Van Dyke, Gardner, Linn & Burkhart, LLP

(57) ABSTRACT

A document holder is provided for a vehicle such as a cart, and especially a shopping cart having a back panel. The document holder includes a writing portion and a bracket portion. A securing member is provided at the writing portion to secure a piece of paper such as a grocery list or coupons. Preferably, the bracket portion has a forward bracket member spaced from a rearward bracket member to define a channel for receiving an upper portion of the back panel to support the holder. The securing member may be configured to hold a writing instrument. An advertisement holder may be positioned on the holder to hold and protect advertisements, store announcements, pictures, or the like while also providing a writing surface thereon. In a preferred embodiment, a document holder includes a flexible, resilient frame or bumper, and/or a two-piece bracket portion for attachment to a shopping cart.

30 Claims, 9 Drawing Sheets

U.S. PATENT DOCUMENTS

| | | |
|---|---|---|
| 4,858,353 A | 8/1989 | Krebs et al. |
| 4,938,402 A | 7/1990 | Anatra et al. |
| 5,004,252 A * | 4/1991 | Kraper ................ 280/33.992 |
| 5,086,960 A | 2/1992 | Schwietzer |
| 5,154,330 A | 10/1992 | Haynes |
| D331,076 S | 11/1992 | Montgomery |
| D352,588 S | 11/1994 | Orphan |
| D366,903 S | 2/1996 | Baggott |
| D391,296 S | 2/1998 | Hill, Sr. |
| D411,904 S * | 7/1999 | Risholm et al. .............. D34/27 |
| D413,928 S | 9/1999 | Cianci |
| 6,029,380 A | 2/2000 | Goddard |
| 6,332,285 B1 | 12/2001 | Aaldenberg et al. |
| 6,453,588 B1 | 9/2002 | Lykens |
| 6,832,767 B1 | 12/2004 | Sandvik et al. |
| 2004/0251289 A1 * | 12/2004 | Chretien et al. .............. 224/411 |

* cited by examiner

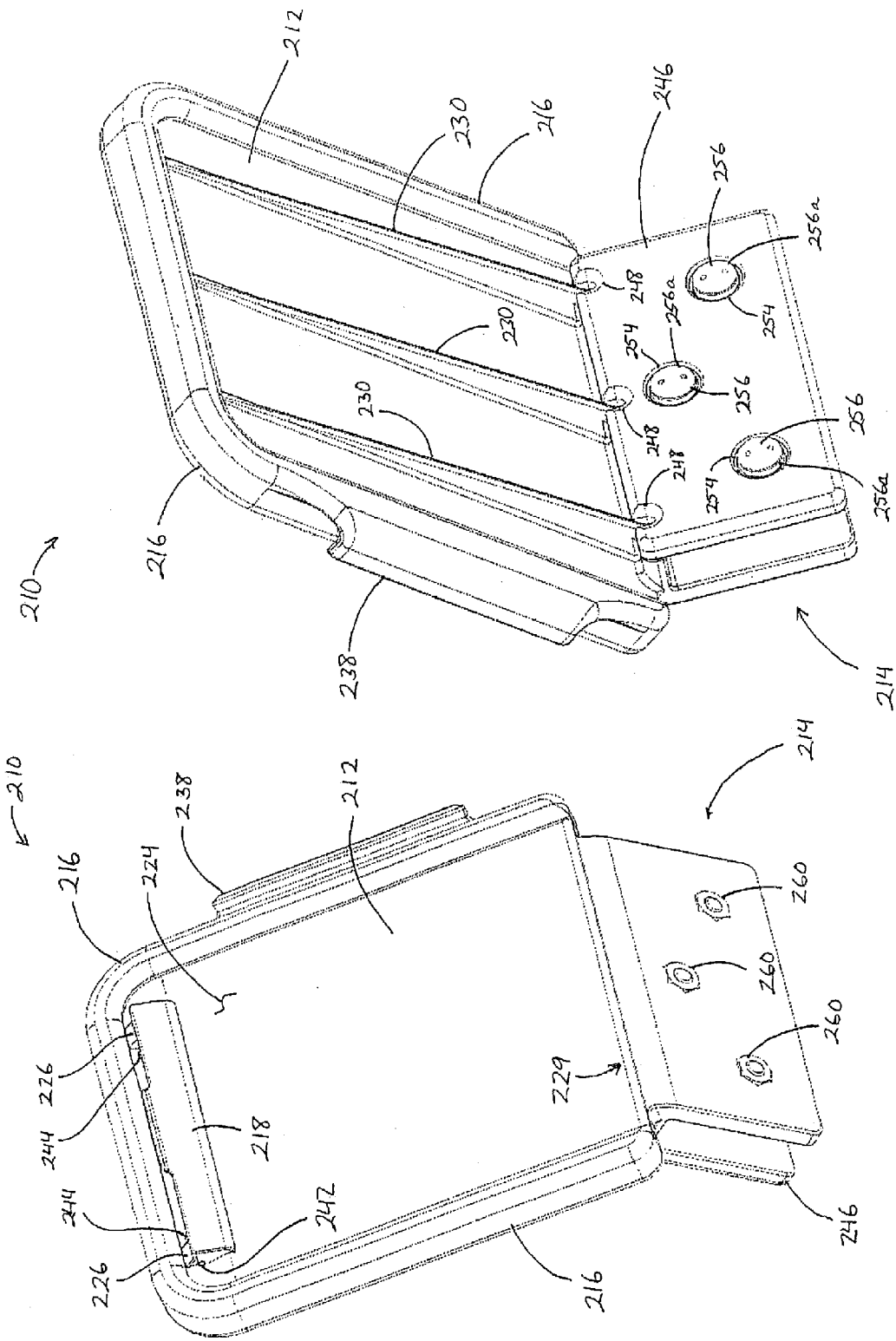

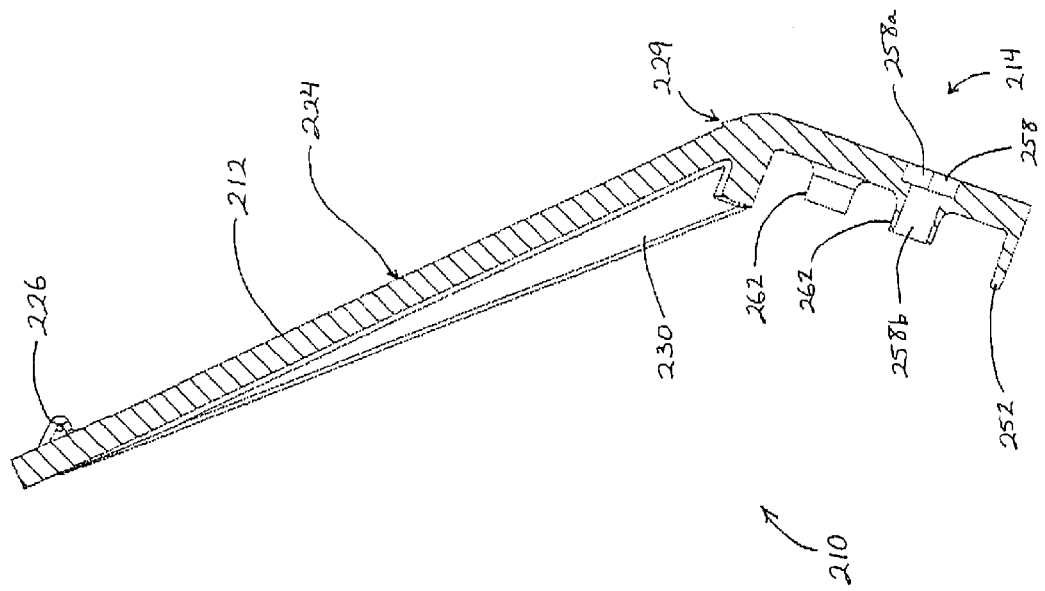
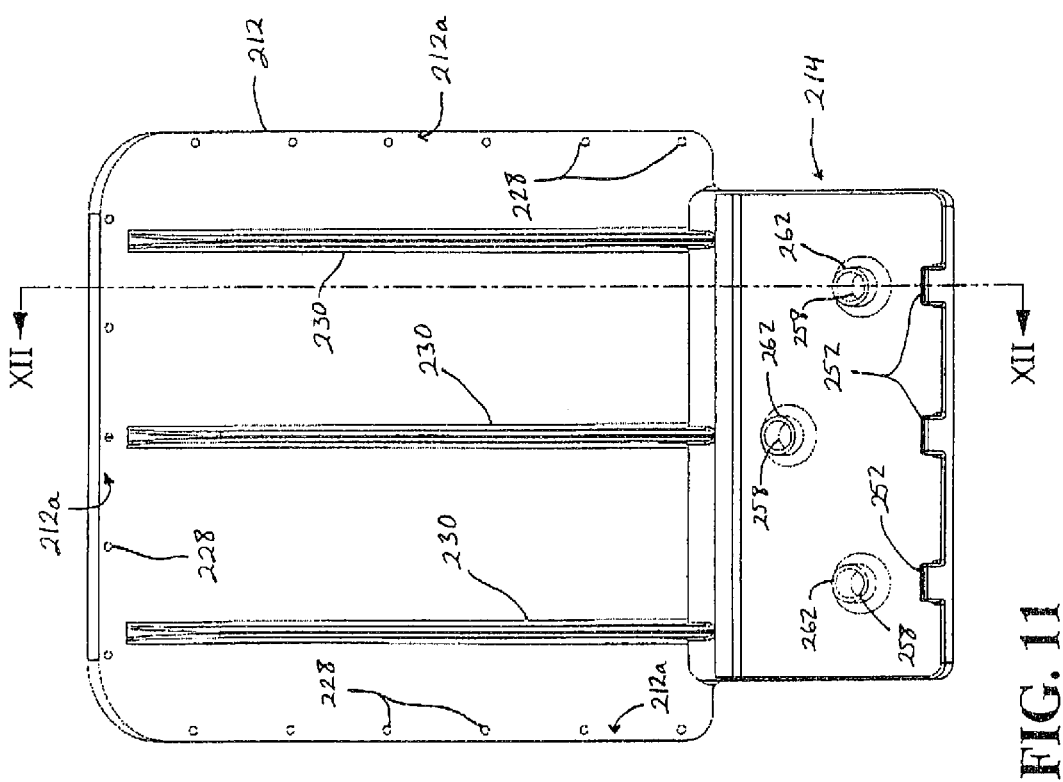
FIG. 12
FIG. 11

DOCUMENT HOLDER FOR CARTS

CROSS REFERENCE TO RELATED APPLICATION

The present invention claims the benefit of U.S. provisional application, Ser. No. 60/975,583, filed Sep. 27, 2007, and of U.S. provisional application, Ser. No. 61/078,996, filed Jul. 8, 2008, which are hereby incorporated herein by reference in their entireties.

FIELD OF THE INVENTION

The present invention relates generally to document holders, and more particularly, to document holders for attachment to vehicles such as carts, and especially to a grocery shopping cart.

BACKGROUND OF THE INVENTION

Shopping for groceries at a store is often conducted by a shopper who pushes a shopping cart through the store. Oftentimes, the shopper also carries a grocery list, coupons, a writing utensil, and the like while pushing the cart through the store, and may have a child in a child seat area of the cart. To keep track of items that are written on the grocery list and that have been placed inside the cart or receptacle, shoppers typically cross out items on their shopping list as they are placed on the cart. However, shopping carts typically are not equipped with a suitable writing surface on which items may be added to or crossed off of a grocery list. Further, typical shopping carts do not have a location suitable for securing coupons, a grocery list, or a writing instrument.

Although various list holders have been developed for mounting to shopping carts, previous devices typically protrude undesirably into the child's seating area of the cart, do not provide a comfortable and convenient writing location and orientation for the shopper, have a high parts count, interfere with the nesting of multiple carts, block or interfere with a shopper's access to the child area of the cart, are prone to breakage, or have some combination of these drawbacks.

SUMMARY OF THE INVENTION

The present invention provides a document holder for vehicles such as carts, and especially for shopping carts, that is adapted to be permanently or semi-permanently attached to a shopping cart to provide a convenient writing surface that does not substantially interfere with normal shopping tasks.

According to one form of the present invention, a document holder is provided for attachment to a back panel of a shopping cart. The document holder includes a writing portion, a bracket portion, and a web portion. The bracket portion receives the back panel and supports the writing portion in a fixed position above the back panel of the cart. The web portion connects the writing portion and the bracket portion so that the writing portion is supported above the back panel, thereby preventing interference between the document holder and another cart when the carts are nested together for storage. A securing member is provided at the writing portion for securing a piece of paper such as a list or coupons.

The bracket portion preferably includes a forward bracket member spaced from a rearward bracket member to define a channel. The channel receives a portion of the back panel of the shopping cart so that the board is supported solely at and by the back panel.

The securing member is preferably a clip adapted to clasp and secure a piece of paper or list.

In one aspect, the document holder is positioned adjacent to a side panel of the shopping cart.

In another aspect, the clip is adapted to secure a writing instrument in addition to a piece of paper or a list.

According to yet another aspect, the document holder includes an advertisement holder at the writing portion for securing an advertisement to the holder. The advertisement holder may be made of a translucent or transparent planar sheet spaced from the writing portion.

In still another aspect, the document holder includes at least one fastener at the bracket portion. Apertures may be provided in the forward bracket member and rearward bracket member for receiving the fastener. The back panel of the shopping cart may include at least one horizontal bar such that the fastener may be positioned below the bar when the bar is received within the channel between the forward and rearward bracket portions. Where the back panel includes at least two spaced horizontal bars, the fastener may be positioned between two of the bars.

In a further aspect, the writing portion of the document holder is wider than the bracket portion, and the document holder is positioned such that the writing portion overhangs the side panel such that the document holder interferes as little as possible with the storage space within the cart or the baby seat area of the cart.

In a still further aspect, the writing portion of the document holder is angled at approximately 25 degrees to 75 degrees from vertical, and may be about 45 degrees from vertical.

In yet another aspect, the document holder includes a web portion between the bracket portion and the writing portion. The web portion may be at least approximately 1.5 inches in height.

According to still another aspect, the writing portion of the document holder has a width of approximately five inches and a height of approximately six inches.

In another aspect, the document holder includes a pouch for receiving coupons. The pouch may be positioned at the web portion, the bracket portion, or the writing portion of the document holder.

According to another form of the present invention, a document holder for a cart or other vehicle having a back panel includes a board having a writing portion, a bracket portion, and a frame portion. The bracket portion supports the writing portion at the cart. The frame portion is installed around a perimeter region of the writing portion of the board. A securing member at the writing portion secures a piece of paper, such as a shopping list.

In one aspect, the frame portion is made of a resilient, flexible material, such as rubber or the like. Optionally, the frame portion includes a U-shaped channel for receiving a writing instrument.

In another aspect, the bracket portion is a two-piece bracket including a separable backing plate. The back panel of the cart is received between the backing plate and bracket portion, and the two pieces are joined together by fasteners. Optionally, the backing plate includes notches that are aligned with ribs on the back of the writing surface for guiding and securing the backing plate as it is tightened to the bracket portion. Optionally, tabs are provided at the two-piece bracket portion. The tabs engage one another to urge the backing plate toward the writing portion as the backing plate is tightened, thus clamping the bracket onto rungs of the cart in two different directions.

According to another aspect, the writing portion includes a lip at a lower portion of the writing portion. The lip cooperates with the frame portion and/or the securing member to hold a sheet, such as an advertisement or the like, to the writing portion, whereby the sheet becomes a writing surface.

Therefore, the document holder of the present invention provides a shopper with a conveniently positioned writing surface with a clip for holding a paper or other shopping list, coupons, a writing instrument, or the like. Further, the document holder may be positioned on the cart so as to be minimally intrusive into the child seating area and to minimally obstruct the shopper's access to the child seating area, to provide convenient left-handed or right-handed use, while still permitting normal nesting of multiple shopping carts.

These and other objects, advantages, purposes, and features of the present invention will become apparent upon review of the following specification in conjunction with the drawings.

BRIEF DESCRIPTION OF THE DRAWINGS

FIGS. 8A and 8B are front and rear perspective views, respectively, of the document holder of FIGS. 7A and 7B;

FIG. 11 is a rear elevation of a writing portion and bracket portion of the document holder of FIG. 10; and FIG. 12 is a left sectional view of the writing and bracket portions, taken at section line XII of FIG. 11.

DESCRIPTION OF THE PREFERRED EMBODIMENTS

Figure 1:
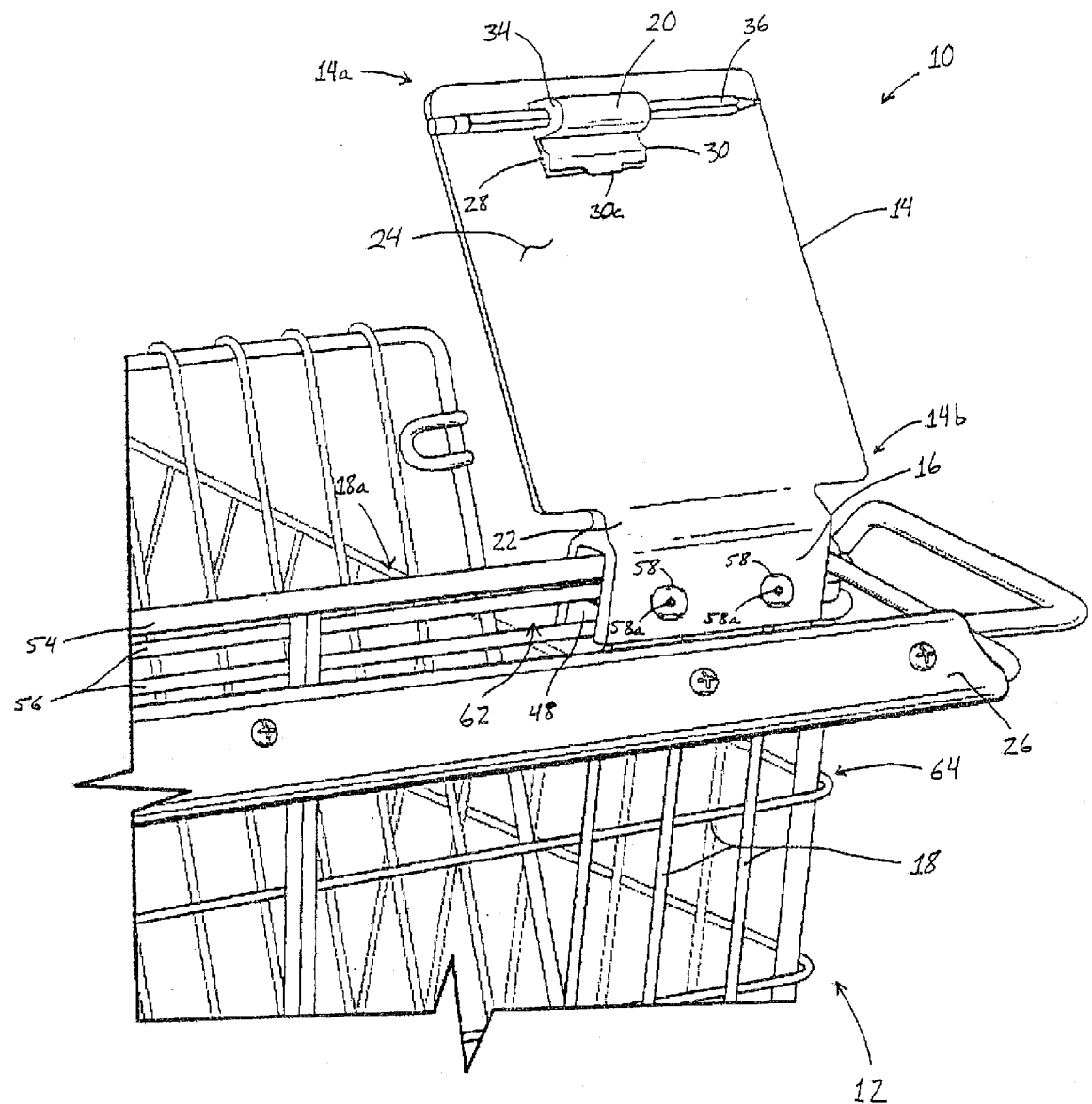
FIG. 1 is a perspective view of an exemplary embodiment of the document holder of the present invention mounted at a shopping cart.

Referring now to the drawings and the illustrative embodiments depicted therein, a document holder 10 is provided at a shopping cart 12 for holding documents and for providing a convenient writing surface at the cart 12 (FIG. 1). Document holder 10 includes a writing portion 14 and a support or bracket portion 16 and is adapted to be supported at a rigid back panel 18 of shopping cart 12. Although shown and described as being mounted to back panel 18, it will be appreciated that the document holder may be installed substantially anywhere along cart 12 (or other vehicle), including at or adjacent the back or rear portion of the cart.

Figure 4:
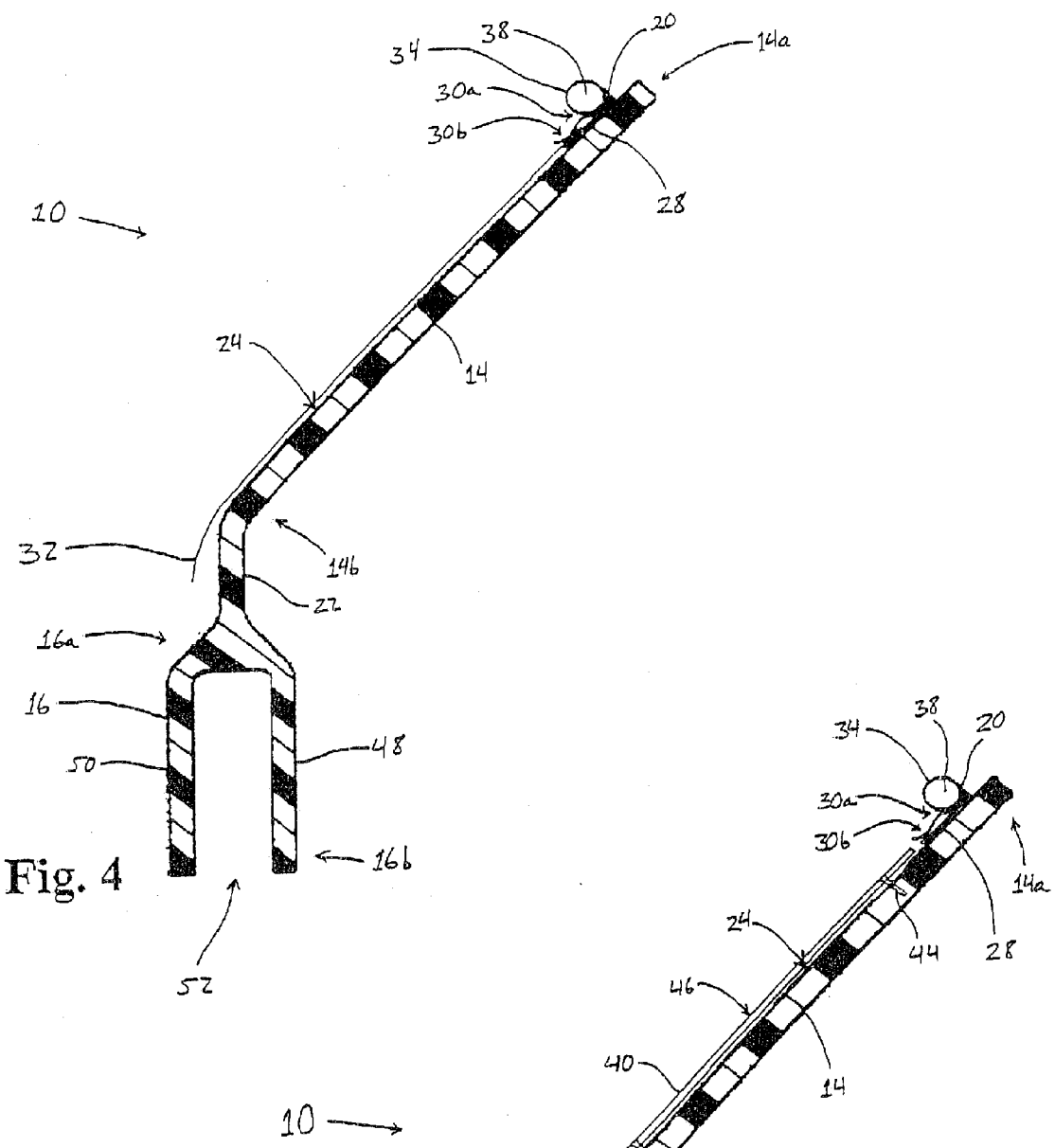
FIG. 4 is a side elevation of the document holder of FIG. 1 with a document held at the clip.
Figure 5:
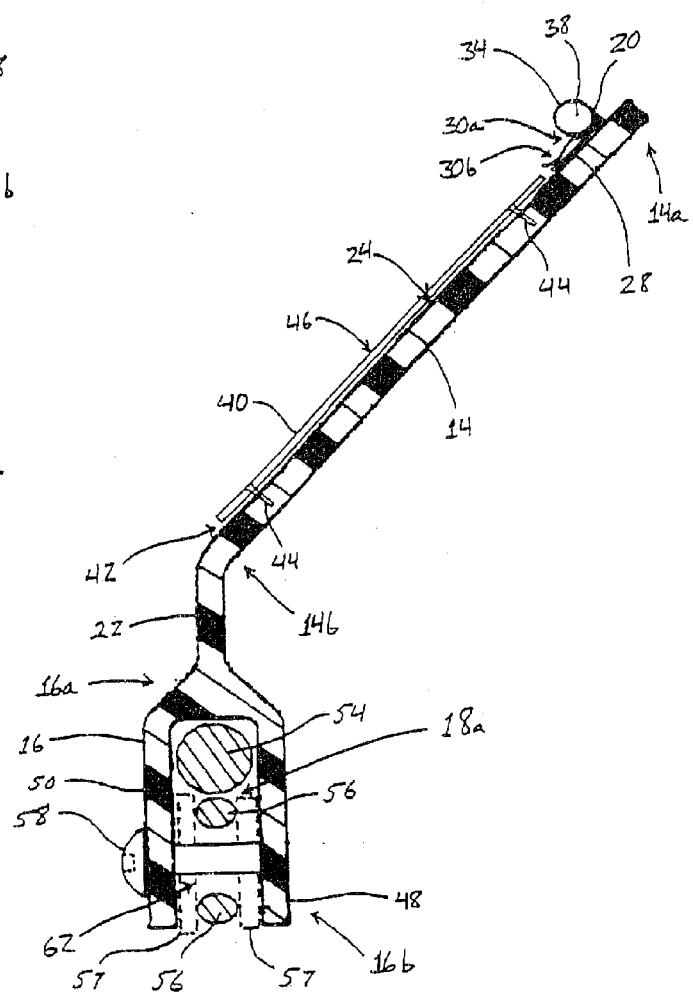
FIG. 5 is a sectional side elevation of the document holder of FIG. 1 with an advertisement holder mounted thereon showing the document holder installed at the back panel of a shopping cart.

Writing portion 14 includes a securing member 20 for holding a piece of paper such as a list on writing portion 14. Preferably, securing member 20 is a clip near an upper end 14a of writing portion 14. A connecting member or web 22 is connected at a lower end 14b of writing-portion 14, and is further connected to bracket portion 16 at the upper end 16a of the bracket portion (FIGS. 4 and 5).

Writing portion 14 is a substantially flat, generally planar board or plate member that is sized and positioned for convenient writing on an exposed writing surface 24. For example, writing portion 14 may be approximately three inches in width and approximately four inches in height, and may be angled away from a shopper standing behind cart 12 at about 25 degrees to 75 degrees from the vertical, and preferably approximately 45 degrees from the vertical. More preferably, writing portion 14 may be approximately five inches in width and approximately six inches in height, or more, depending on the application. Further, and as best seen in FIG. 1, document holder 10 may be positioned at a far left or far right location on back panel 18 of shopping cart 12 to provide convenient left-handed or right-handed use, respectively. Bracket portion 16 and web 22 have widths that are less than the width of writing portion 14 such that placement of bracket portion 16 at a side of back panel 18, adjacent a side edge region 64 of back panel 18, places apart of writing portion 14 outboard of the side edge region 64.

It will be appreciated that lower end 14b of writing portion 14 is positioned at a sufficient height above back panel 18 to provide clearance for the handle of another cart nested to the front end of shopping cart 12. The height of web 22 may be selected based upon the height of a cart handle 26 relative to the height of back panel 18 so that a plurality of shopping carts that are substantially identical to cart 12 may be nested together without document holder 10 contacting or interfering with cart handles 26 and/or impeding the normal nesting of multiple carts. For example, web 22 may have a height of approximately 0.25 inches to 5 inches to provide adequate clearance for cart handles 26. More preferably, web 22 may have a height of approximately 1 inch to 3 inches.

It will be appreciated that writing portion 14, bracket portion 16, and web 22 can be molded or formed as a single piece, such as from plastic or synthetic polymeric resin, glass-filled resin, metal, or any sufficiently strong material. Alternatively, the writing portion, bracket portion, and web may be made from two or more separate pieces and joined together such as with fasteners, by welding, gluing, or similar joining methods.

Figure 2:
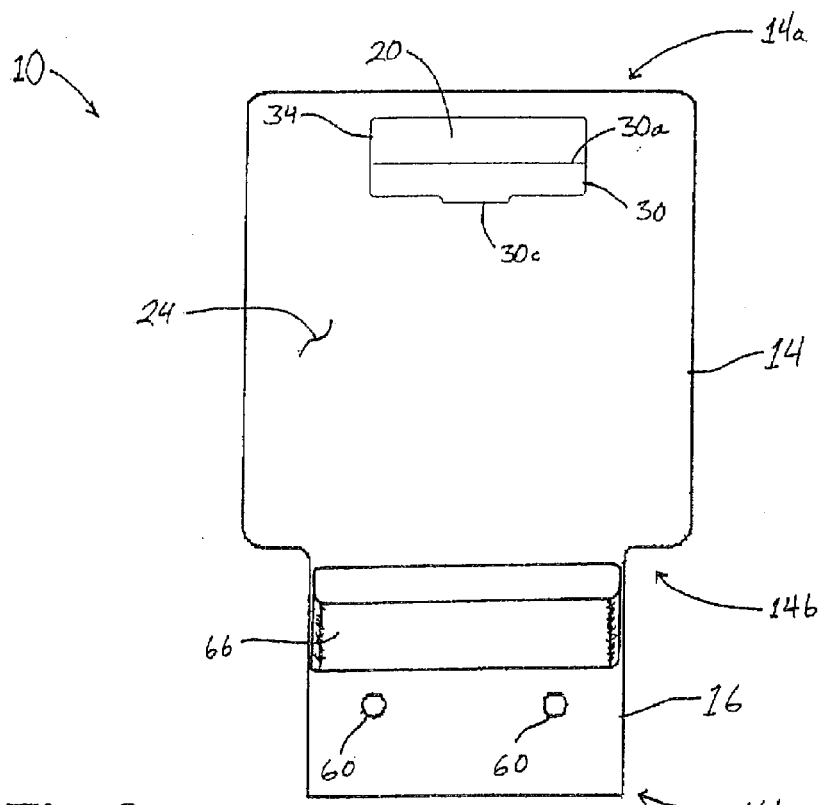
FIG. 2 is a front elevation of the document holder of FIG. 1.
Figure 3:
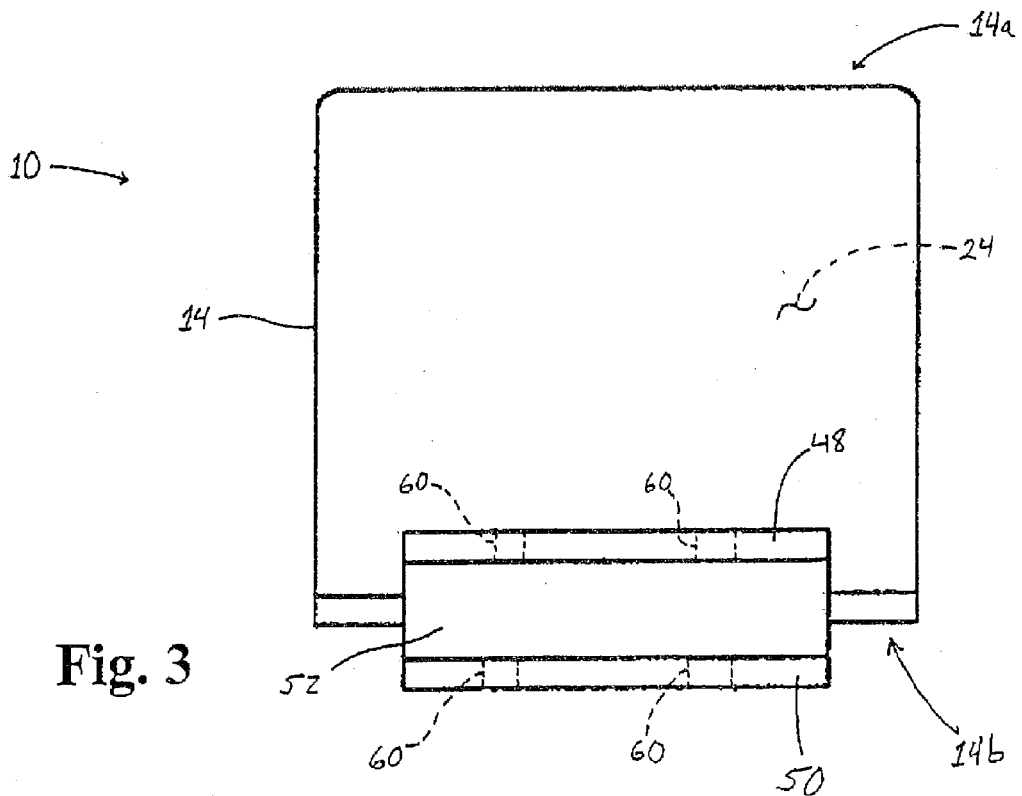
FIG. 3 is a bottom plan view of the document holder of FIG. 1.

Securing member 20 includes a base 28 for mounting member 20 to writing surface 24 near upper end 14a of writing portion 14 (FIGS. 1, 4, and 5). A clamping member or clamp 30 is mounted at an upper portion of base 28 for holding one or more documents 32, such as a shopping list, coupons, or the like (FIG. 4). Clamp 30 is a resilient member that is fixed to base 28 at a mount end 30a, and has a contact region 30b that naturally rests in contact with or slightly separated from base 28 so that documents 32, which are typically thin paper, may be held, secured, clamped, or pinched between contact region 30b and base 28 (FIGS. 1, 4, and 5). A lift tab 30c is provided at a lower end of clamp 30 to facilitate manual lifting of clamp 30 to enlarge the space between contact region 30b and base 28, such as when inserting documents 32 (FIGS. 1, 2, and 4).

Additionally, and as shown, securing member 20 includes an instrument holder 34 for holding a writing instrument 36 such as a pen or pencil. Instrument holder 34 includes a substantially round passageway 38 through which writing instrument 36 is passed for temporary storage of the instrument. Alternatively, a clip having an outwardly opening channel with resilient side walls (not shown) may be provided such that writing instrument 36 may be snap-fit into the channel opening and between the resilient side walls. Optionally, the clip may include a hingedly mounted clamp that is spring-loaded to provide clamping force between the contact region and the base of the clip or the writing surface. Further, contact region 30b and/or base 28 may be lined with a high-friction material to facilitate the retention of documents 32 in securing member 20.

Optionally, and with reference to FIG. 5, an advertisement holder 40 may be attached to writing portion 14 at writing surface 24 to provide a space or thin gap 42 between holder 40 and writing surface 24 in which an advertising sheet, store announcements, pictures, or the like (not shown) may be temporarily or permanently mounted for display to the shopper. Advertisement holder 40 is a transparent or translucent planar member that is optically clear to provide substantially unobstructed viewing of the advertisement located in gap 42 and to protect the advertisement from scratches and spills, for example. Advertisement holder 40 is fastened to writing portion 14 with countersunk screws 44 or, alternatively, may be fastened to writing portion 14 by gluing, heat-welding, riveting, or with hook-and-loop fasteners, for example. The advertisement may be positioned in gap 42 by first loosening screws 44 to enlarge gap 42, inserting the advertisement between holder 40 and writing surface 24, and tightening screws 44 to urge holder 40 into contact with the advertisement and/or writing surface 24. Advertisement holder 40 may be made from any sufficiently clear, strong, scratch-resistant, and chemical-resistant material, such as glass, acrylic, Lexan®, or other resinous materials, for example. Thus, the exposed surface of advertisement holder 40 provides an alternative writing surface 46 through which advertisements may be viewed when alternative writing surface 46 is not obstructed by one or more documents 32, held by securing member 20.

Bracket portion 16 includes a front bracket member 48 and a rear bracket member 50 (FIGS. 1, 3, 4, and 5). Front and rear bracket members 48, 50 are spaced to define a channel 52 therebetween for receiving an upper portion 18a of back panel 18 (FIGS. 1 and 5). Shopping cart 12 may typically be equipped with an upper horizontal bar 54 and one or more additional horizontal bars 56 extending generally parallel to and proximate upper horizontal bar 54. Channel 52 preferably has a width of about 0.25 inches to one inch and is sized to receive bars 54, 56. Optionally, one or more fillers or shims 57 (FIG. 5) may be provided at channel 52 between front bracket member 48 and/or rear bracket member 50 and horizontal bars 56, in order to adapt bracket portion 16 to a particular cart, for example. A pair of fasteners 58 are received in through-holes 60 defined in front bracket member 48 and rear bracket member 50 (FIGS. 1 and 2). Fasteners 58 are threaded carriage or other headed bolts, such as bolts having an allen wrench socket 58a therein, that engage internal threads in through-holes 60 or, alternatively, that engage threaded nuts (not shown) adjacent front bracket member 48. Carriage bolts 58 (FIG. 5) are provided to reduce the likelihood of the bolt heads scratching or gouging a shopper or a child, or to render holder 10 more tamper-resistant, for example, especially when the bolts engage internal threads in through-holes 60. It is further envisioned that various other types of fasteners may be used to hold holder 10 to cart 12, such as screws, hex-headed bolts, a strap, clasps, a snap-fit feature, or the like.

Through holes 60 are aligned with a gap 62 defined between horizontal bars 56 of back panel 18, and fasteners 58 are driven or positioned in through holes 60 and gap 62 to fix document holder 10 to shopping cart 12 (FIGS. 1 and 5). Fasteners 58 may be tightened to provide a clamping force on one or more of upper horizontal bar 54 and horizontal bars 56 to rigidly hold bracket portion 16 to upper portion 18a of back panel 18 by drawing front bracket member 48 and rear bracket member 50 inward toward one another in order to narrow channel 52.

Accordingly, document holder 10 provides for storage and convenient placement of documents 32 at clamp 30 while permitting substantially unobstructed access to the child seat area of shopping cart 12, and without substantially intruding into the child seat area or interfering with the conventional nesting of multiple carts. A flat writing surface is provided at a convenient angle for writing by a standing shopper and is positioned at either the left or right side of cart 12 to facilitate use by either left-handed or right-handed shoppers.

Figure 6:
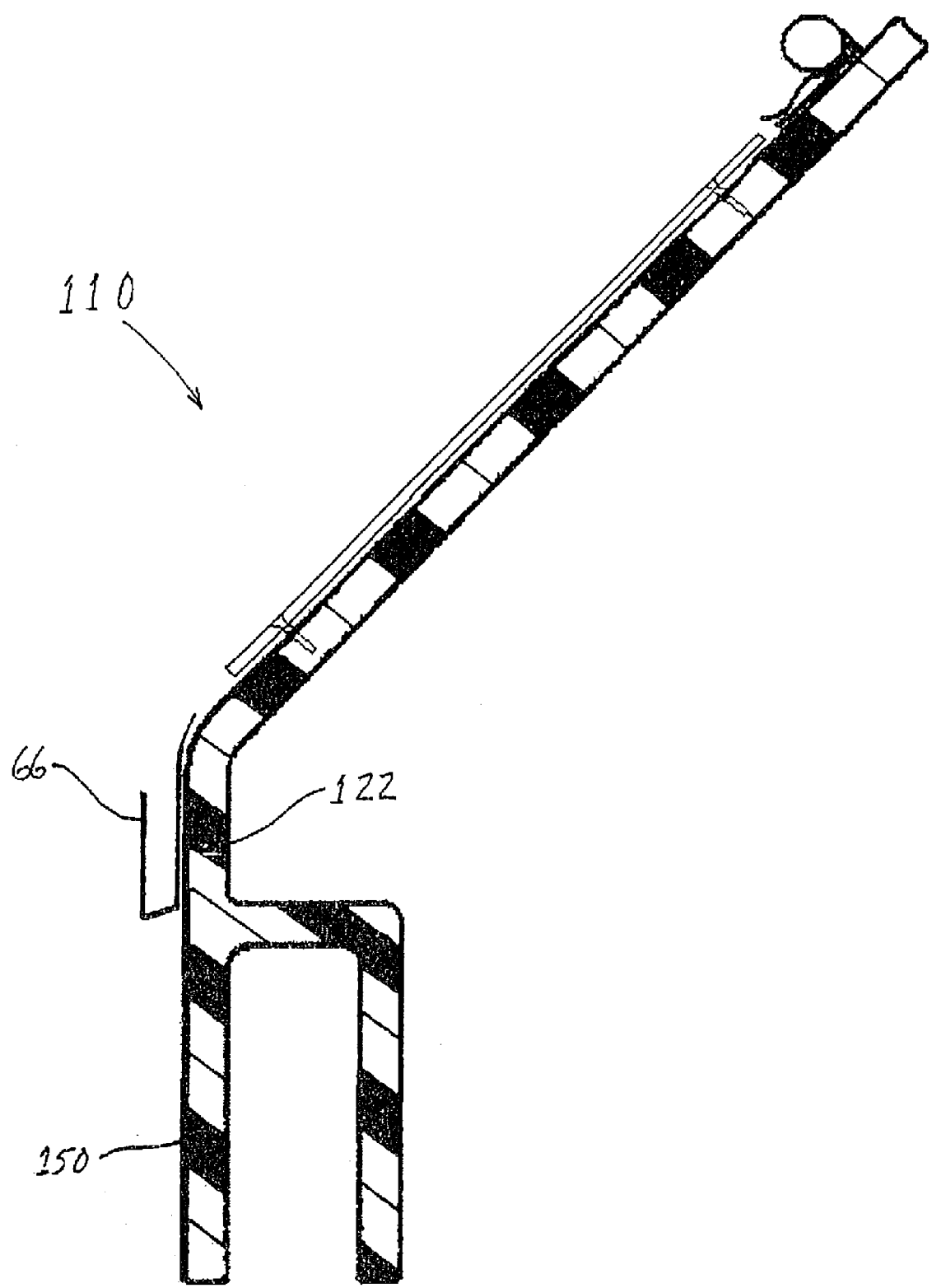
FIG. 6 is a sectional side elevation of an alternative document holder according to the present invention.
Figure 7A:
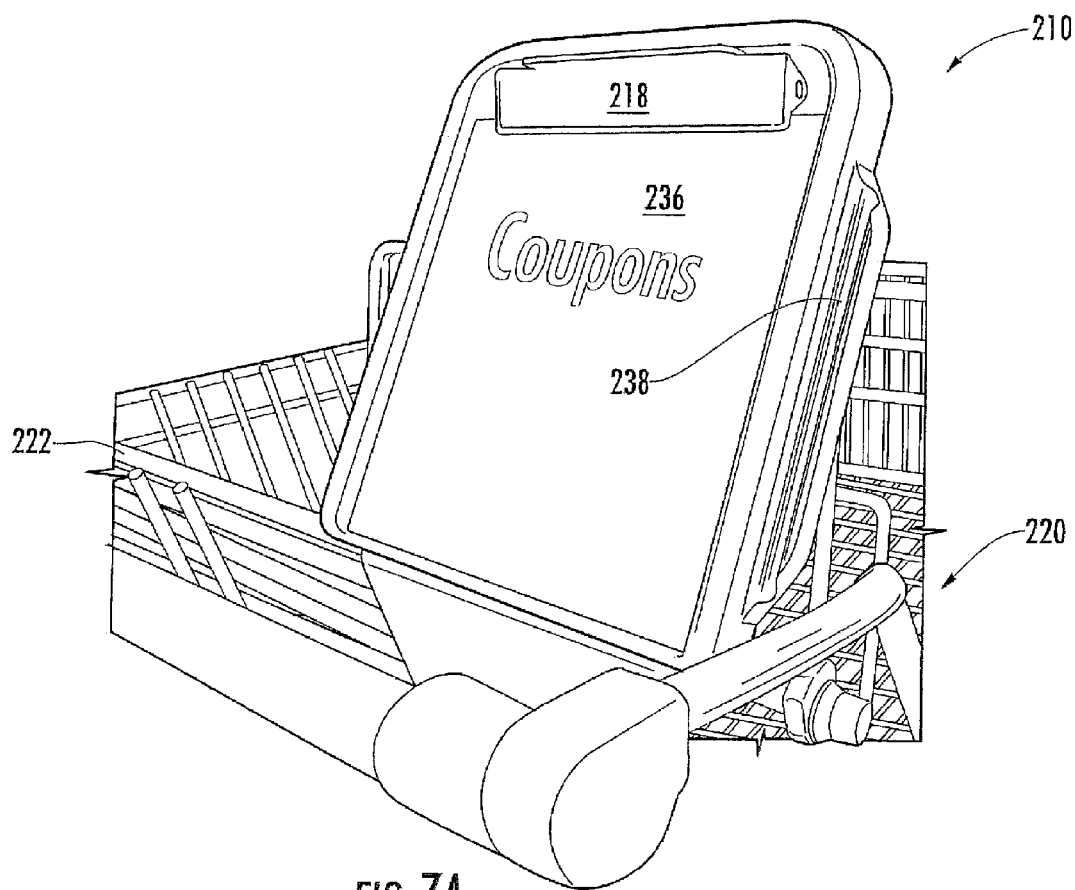
FIG. 7A is a perspective view of another embodiment of the document holder mounted at a shopping cart.
Figure 7B:
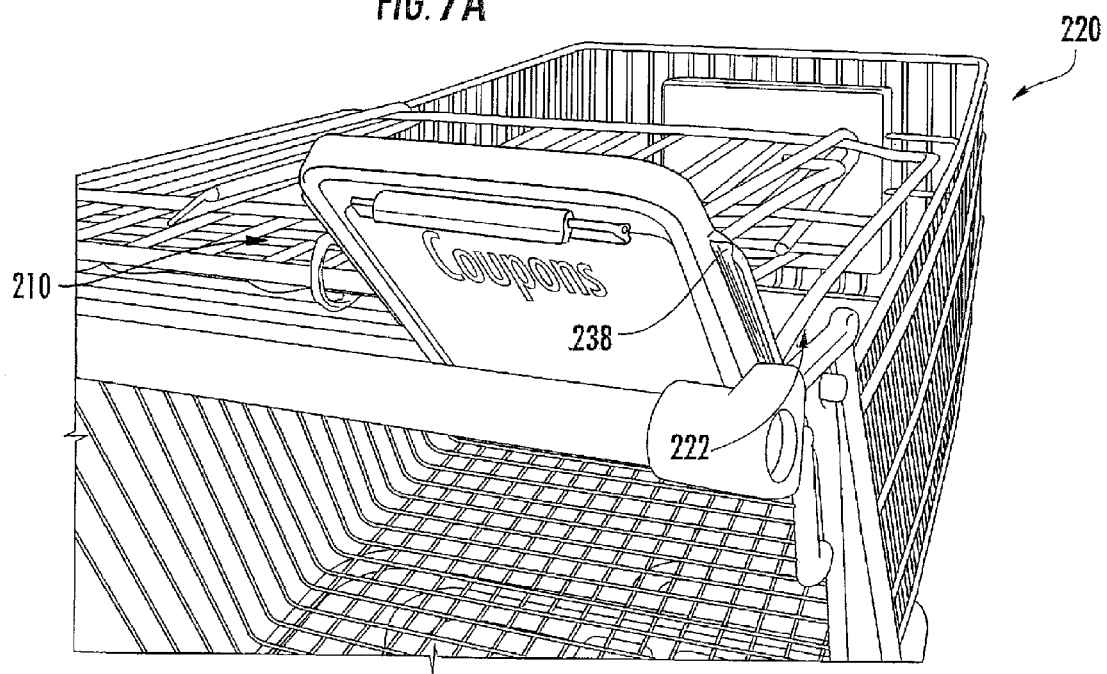
FIG. 7B is a perspective view of the document holder of FIG. 7A, with a back panel of the cart pivoted for nesting with another cart.

Those skilled in the art will recognize that variations may be carried out without departing from the spirit and scope of the invention. For example, although web 22 is generally centered between front bracket member 48 and rear bracket member 50, it will be appreciated that an alternative document holder 110 (FIG. 6) may be provided with a web 122 that is located directly above a rear bracket member 150 to provide additional clearance for a cart handle when multiple carts having a different cart handle and/or back panel configuration from shopping cart 12 are nested together. Additionally, a receptacle or pouch 66 (FIGS. 2 and 6) may be provided at document holder 10, 110, such as at web 22, 122 of document holder 10, 110. Pouch 66 is approximately the same width of web 22, 122 and is sized to receive typical coupons. Pouch 66 includes a bottom wall 67, spaced side walls 68, and a front wall 70 spaced from a back wall 72 to define a chamber having an open top end 74 for receiving coupons therein. Pouch 66 thus provides a convenient storage location for coupons and writing instruments, for example, and may be attached to the document holder near the web portion or the bracket portion so as not to interfere with the writing surface of the document holder. Alternatively, a pouch may be located alongside or behind the writing portion. Pouch 66 may be unitarily formed into the document holder, or may be a separate component fastened at its back wall 72 to the document holder, such as with adhesive, mechanical fasteners, heat-welding, or a similar method or device.

Optionally, and with reference to FIGS. 7A-12, another alternative document holder 210 includes a writing portion 212, a bracket portion 214, and a bumper or frame portion 216. A securing member 218 is positioned near an upper region of writing portion 212 for retaining a thin sheet, such as a paper shopping list or coupons or the like, at writing portion 212. Bracket portion 214 is fastenable to a shopping cart 220 having a back panel 222. Bracket portion 214 supports writing portion 212 above the back panel 222 of the shopping cart and pivots with the back panel to permit normal pivoting motion of back panel 222 (FIG. 7B), such as during nesting of multiple shopping carts. Although shown and described as being mounted to back panel 222, it will be appreciated that the document holder may be installed substantially anywhere along cart 220 (or other vehicle), including at or adjacent the back or rear portion of the cart.

Writing portion 212 includes a perimeter region or edge portion 212a (FIGS. 10 and 11) that substantially surrounds a planar writing surface 224 and is positioned generally above bracket portion 214, which portion 212a may be integrally formed with writing portion 212. A pair of hinge supports 226 (FIGS. 8A, 10, and 12) are provided at an upper end of writing portion 212 for pivotally supporting securing member 218, as will be described below. A plurality of through-holes 228 are spaced along edge portion 212a of writing portion 212 to facilitate the connection of frame portion 216 at writing portion 212. As best seen in FIGS. 8A, 10, and 12, writing surface 224 may terminate at a projection or lip 229 at a lower portion of writing portion 212. Lip 229 facilitates attachment of a coupon or advertisement, as will be described below. One or more structural supports, ribs, or webs 230 (FIGS. 8B, 9 and 11) are provided along and preferably integrally formed on a back surface of writing portion 212 to enhance the structural rigidity of writing portion 212.

Frame portion 216 substantially surrounds perimeter region or edge portion 212a of writing portion 212 (FIGS. 8A-10). Frame portion 216 is a generally U-shaped member with a downwardly-facing open end, and has a C-shaped channel 232 (FIG. 10) extending along an interior surface thereof. Optionally, and as shown, numerous projections 234 are located inside and span substantially across the C-shaped channel 232. Projections 234 are spaced to coincide with through-holes 228 of writing portion 212. Projections 234 are received in through-holes 228 as C-shaped channel 232 receives edge portion 212a of writing portion 212 to secure frame portion 216 to writing portion 212.

C-shaped channel 232 overhangs edge portion 212a, inboard of through-holes 228 and projections 234, to permit a perimeter region of a thin film, sheet, or laminate 236 (FIGS. 7A and 7B) to be slid or inserted partially into C-shaped channel 232 between frame portion 216 and writing surface 224. Upper and side regions of sheet 236 may be frictionally retained between frame portion 216 and writing surface 224. Sheet 236 is further prevented from sliding or slipping downwardly by lip 229 (FIG. 12), which is configured to support a lower edge of sheet 236 when the sheet is installed at writing surface 224 and held against writing surface 224 by frame portion 216 and securing member 218. Sheet 236 may be removed from document holder 210 such as by inserting a fingernail or a thin tool between the bottom edge of sheet 236 and lip 229 to lift sheet 236 away from writing surface 224. Sheet 236 may provide advertising, coupons, writing material, or the like to a cart user. Sheet 236 serves as a writing surface when installed at writing portion 212 so as to substantially cover writing surface 224, such that sheet 236 need not be removed prior to use of writing portion 212 for writing.

Optionally, securing member 218 holds a top portion of sheet 236 against writing surface 224 to assist in maintaining sheet 236 in a fixed position. In the illustrated embodiment, an instrument holder 238 (FIGS. 8A, 8B, and 10) is provided at frame portion 216 for holding a writing instrument such as a pen or pencil. Instrument holder 238 may be a U-shaped, flexible, resilient, snap-in/snap-out type holder that is integrally formed with frame portion 216 and positioned along an outer surface of the frame portion to facilitate access to a writing instrument supported thereat. Optionally, a pocket or pouch, similar to pouch 66 described above, may be provided at writing portion 212, bracket portion 214, or bumper portion 216 for additional storage space at document holder 210.

Frame portion 216 may be made of a resilient material, such as a rubber or rubber-like material, a soft plastic or rubberized material, or the like. The use of a soft, high-friction material such as rubber facilitates installation of frame portion 216 at writing portion 212, facilitates the use of frame portion 216 to frictionally retain sheet 236 against writing portion 212, and provides a soft-touch surface that is not prone to scratch persons or snag clothing, or injure children seated in the cart 220, for example. Thus, frame portion 216 may act as a bumper or protector for persons or objects that may impact or brush against document holder 210. Optionally, the frame portion may be integrally formed with the writing portion, and/or may be made from harder materials such as hard plastics and the like, without departing from the scope of the present invention.

Securing member 218 is pivotally connected to writing portion 212 at hinge supports 226 (FIGS. 8A, 10, and 12). Hinge pins 242 are inserted through complementary holes in securing member 218 and hinge supports 226 to join the securing member to the hinge supports. A spring 244 positioned along each hinge pin 242, inboard of hinge supports 226, urges the securing member 218 to pivot toward writing surface 224. Thus, securing member 218 is operable to clamp a thin sheet or film, such as a paper shopping list, coupons, or the like, against writing surface 224 and/or sheet 236. The shopping list or coupons, or other thin materials, are releasable from securing member 218 by pivoting the securing member away from writing surface 224 against the force of springs 244. Optionally, a logo or other indicia may be printed, screened, stamped, or applied to securing member 218, or substantially anywhere on document holder 210.

Figure 9:
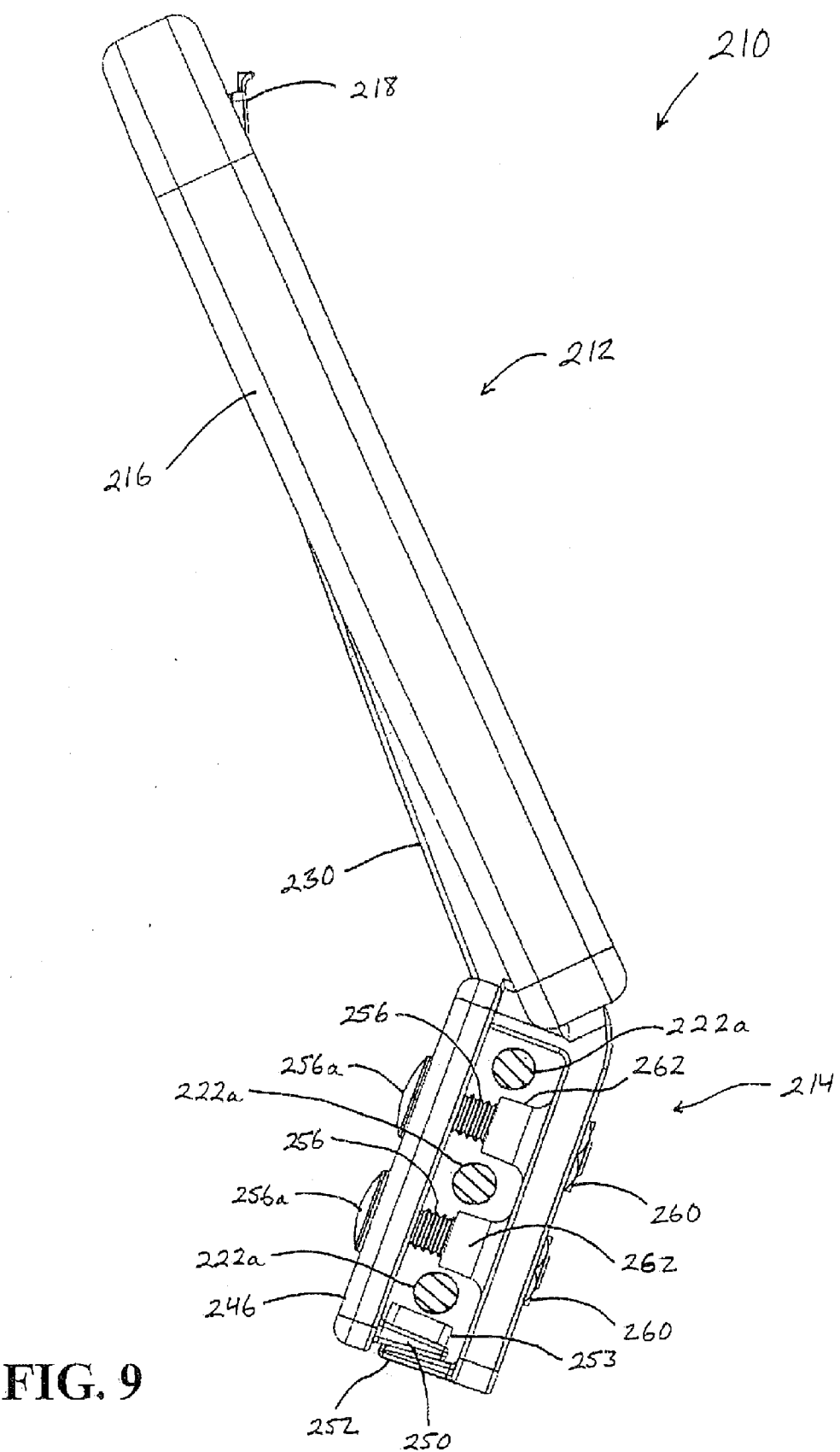
FIG. 9 is a left elevation of the document holder of FIGS. 8A and 8B.
Figure 10:
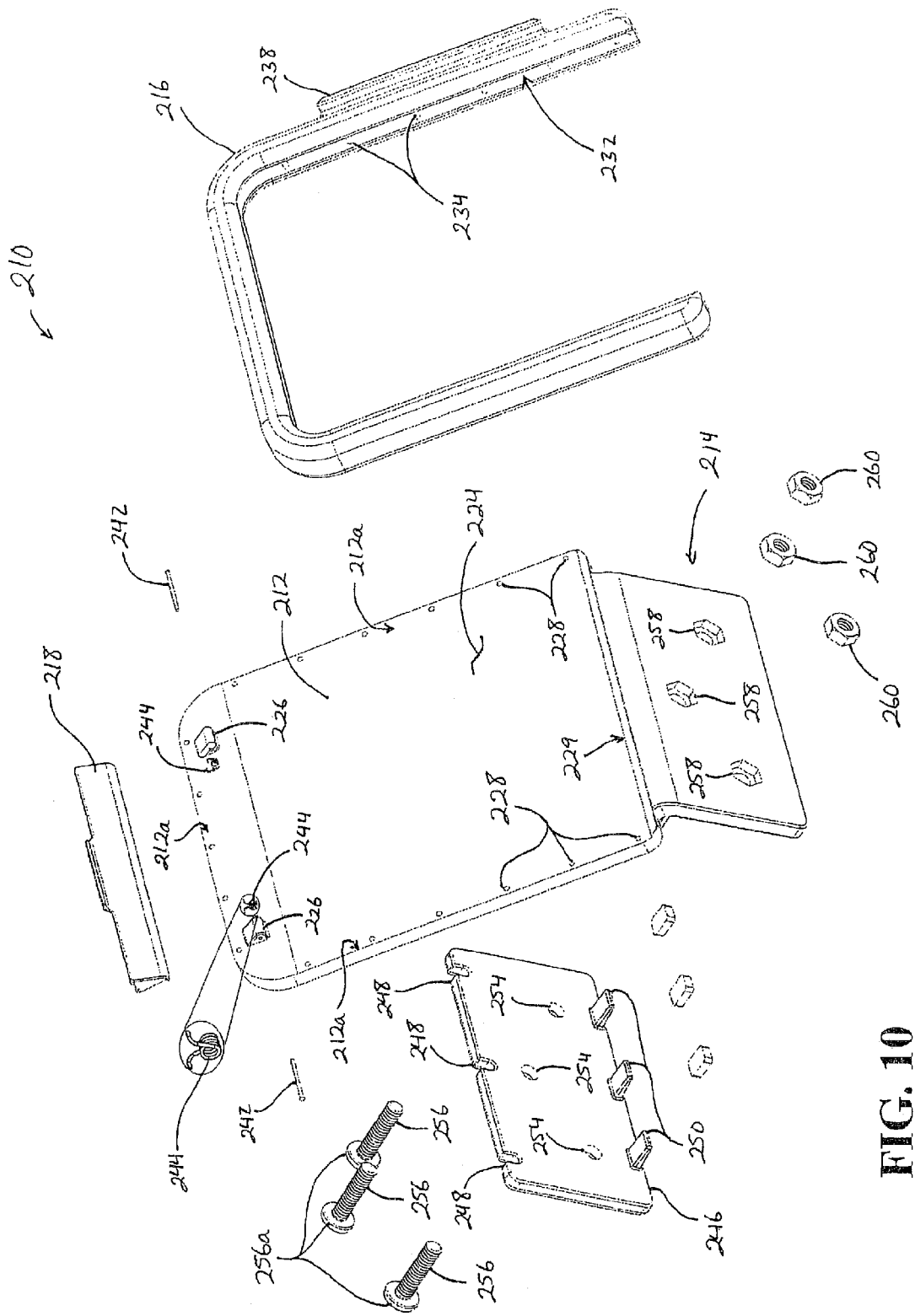
FIG. 10 is an exploded view of the document holder of FIGS. 8A and 8B, including an enlarged view of one spring.

As best seen in FIGS. 8A-10 and 12, bracket portion 214 is angled relative to writing portion 212 to position writing portion 212 at a convenient access and comfortable writing position relative to back panel 222 of shopping cart 220. For example, bracket portion 214 may be angled within a range of about 115° to about 155°, and preferably about 135° relative to writing portion 212, or more or less, to provide a comfortable writing position on any type of cart. A separate backing plate 246 is provided for joining the bracket portion 214 to back panel 222 of the cart. Backing plate 246 is a generally planar member and includes one or more notches 248 (FIGS. 8B and 10) for receiving ribs 230 of writing portion 212, one or more projections or tabs 250 for engaging or receiving corresponding tabs 252 (FIGS. 9-12) at a lower portion of bracket portion 214, and one or more through-holes 254 for receiving fasteners 256, such as threaded bolts or the like. As best seen in FIG. 9, tabs 250, 252 may have inclined, ramped surfaces configured to slidingly engage one another so that backing plate 246 moves upwardly relative to bracket portion 214 as bolts 256 are tightened to draw the backing plate and bracket portion inwardly toward one another. Thus, as bolts 256 are tightened, tabs 250 move upward toward rungs 222a of back panel 222, around which bracket portion 214 is clamped, as notches 248 are guided along ribs 230, to compress or tighten bracket portion 214 and backing plate 246 both vertically and laterally on rungs 222a.

Optionally, a spacer 253 (FIGS. 9 and 10) is positioned between each tab 250 (or tab 252) and an individual rung or wire 222a of back panel 222, to facilitate a customized or close fit of document holder 210 to cart 220. For example, spacers 253 may be soft foam or rubber pads with adhesive applied to one side to facilitate attachment of the spacers to tabs 250 prior to installation of document holder 210 on cart 220. Bracket portion 214 may be fit tightly to back panel 222 by inserting spacers 253 between tabs 250 (or tabs 252) and nearby rungs 222a, and then tightening bolts 256 to squeeze spacers 253 between tabs 250 and rungs 222a, in order to reduce or prevent movement of document holder 210 relative to back panel 222.

Bracket portion 214 includes through-holes 258 corresponding to through-holes 254 in backing plate 246 (FIG. 10). For example, and as shown in FIG. 12, through-holes 258 may include non-circular (such as hexagonal) portions 258a for receiving non-circular fasteners 260 (such as hexagonal threaded nuts), and circular portions 258b for receiving the shafts of bolts 256. A sleeve 262 (FIGS. 9, 11, and 12) projects from a back surface of bracket portion 214 at each through-hole 258 to facilitate installation of document holder 210 at shopping cart 220, as will be described below. Bolts 256 may have tamper-resistant heads 256a such that when bolts 256 are inserted into through-holes 254, 258 and received in nuts 260 in non-circular portions 254a, access to nuts 260 is substantially precluded and only a special tool may be used to rotate and remove bolts 256. Suitable bolts include a ¼-20×1 tamper resistant binding-head screw. For example, heads 256a may be substantially smooth to resist grasping or turning engagement by conventional tools, such as wrenches, screwdrivers, and the like. Heads 256a include a pair of recesses or blind holes 256a' for receiving a special tool (not shown) having a pair of spaced prongs for engagement with holes 256a' to permit turning of bolts 256. Suitable nuts include an 18-8 stainless steel hex nut with ¼"-20 threads, available from McMaster-Carr Supply Co. of Atlanta, Ga.

To install document holder 220 on shopping cart 220, bracket portion 214 and backing plate 246 are placed on opposite sides of back panel 222 of cart 220 with sleeves 262 and tabs 250, 252 aligned with passageways between rungs 222a in back panel 222 (or aligned with molded holes in plastic carts, for example). Bolts 256 are then inserted into through-holes 254, 258 and threaded into nuts 260 and tightened. It will be appreciated that substantially any number of fasteners may be used and positioned substantially anywhere along bracket portion 214, and that various types of fasteners may be suitable, such as straps, snaps or latches, or the like, to adapt the document holder for substantially any cart or vehicle. Alternatively, the document holder may be permanently installed at a cart, such as by molding or heat-welding it onto the back panel or other surface of the cart, without departing from the spirit and scope of the present invention.

Optionally, the document holder may be installed at the child seat backrest panel of a cart, or may be adapted to mount at substantially any other surface of a cart. It will be appreciated that the document holder may be installed at any vehicle or cart, including smaller "convenience", "express", or "Euro" carts that typically have shorter length and two nearly equal-size tiers of storage space compared to fill-size carts, without departing from the spirit and scope of the present invention.

These and other changes and modifications in the specifically described embodiments may be carried out without departing from the principles of the present invention, which is intended to be limited only by the scope of the appended claims, as interpreted according to the principles of patent law including the doctrine of equivalents.

We claim:

1. A document holder for a cart or other vehicle such as a shopping cart having a back panel and a handle at the rear of the cart for pushing the cart while shopping, said document holder comprising:

a board having a writing portion, a bracket portion, and a web portion;

said bracket portion adapted to receive a portion of the back panel of the cart and support said writing portion in a fixed position relative to the portion of the back panel of the cart that is received by said bracket portion, even if the back panel is moved for nesting the cart with another cart;

said web portion connecting said writing portion and said bracket portion in spaced arrangement to support said writing portion spaced above the portion of the back panel that is received by said bracket portion and near the handle of the cart when said bracket portion is received on the back panel, thereby preventing interference when another cart is positioned in a nesting arrangement with the cart and providing access and visibility of said writing portion near the handle while the cart is being pushed by a user; and a securing member at said writing portion, said securing member adapted to secure a piece of paper.

2. The document holder of claim 1, wherein said bracket portion comprises a forward bracket member spaced from a rearward bracket member to define a channel therebetween.

3. The document holder of claim 1, wherein said board is adapted to be supported solely at the back panel of the cart.

4. The document holder of claim 1, wherein said board permits substantially unobstructed access to a child seat area of the cart.

5. The document holder of claim 4, wherein said board is substantially non-intrusive into the child seat area of the cart.

6. The document holder of claim 1, wherein said document holder is adapted to be positioned adjacent a side panel of the shopping cart.

7. The document holder of claim 6, wherein said writing portion is wider than said bracket portion and at least a portion of said writing portion is adapted to overhang the side panel of the shopping cart.

8. The document holder of claim 1, wherein said supporting member is adapted to secure a writing instrument.

9. The document holder of claim 2, further comprising at least one fastener at said bracket portion.

10. The document holder of claim 9, further comprising a first aperture in said forward bracket member and a second aperture in said rearward bracket member, said first aperture and said second aperture adapted to receive said at least one fastener therethrough.

11. The document holder of claim 10, wherein said at least one fastener is positionable below a horizontal member of the back panel of the cart.

12. The document holder of claim 11, wherein said at least one fastener is positionable between the horizontal member and another horizontal member of the back panel of the cart.

13. The document holder of claim 1, wherein said writing portion is angled to the vertical at an angle of between about 25 degrees and 75 degrees.

14. The document holder of claim 13, wherein said writing portion is angled to the vertical at an angle of about 45 degrees.

15. A document holder for a cart or other vehicle such as a shopping cart having a back panel, said document holder comprising:

a board having a writing portion, a bracket portion, and a frame portion;

said writing portion having a writing surface including an upper portion, left and right side portions, and a perimeter region, said perimeter region surrounding at least said upper portion and said left and right side portions of said writing surface;

said bracket portion comprising a two-piece bracket having a separable backing plate, wherein said bracket portion is securable to a panel of the cart and adapted to support said writing portion; and said frame portion adapted to receive at least said perimeter region of said writing portion of said board.

16. The document holder of claim 15, wherein said bracket portion is adapted to support said writing portion adjacent a rear portion of the cart.

17. The document holder of claim 15, wherein said bracket portion is adapted to receive the back panel of the shopping cart.

18. The document holder of claim 17, wherein said document holder is adapted to move with the back panel of the shopping cart when the shopping cart is nested with another shopping cart.

19. The document holder of claim 15, wherein said document holder is adapted to retain a thin sheet or film between said writing portion and said frame portion.

20. The document holder of claim 19, wherein the thin sheet or film is retained at said writing portion via friction between the thin sheet or film and said writing portion or said frame portion.

21. The document holder of claim 15, wherein said frame portion comprises a resilient material.

22. The document holder of claim 15, wherein said frame portion is adapted to secure a writing instrument.

23. The document holder of claim 22, wherein said frame portion comprises a resilient U-shaped member.

24. The document holder of claim 15, wherein said writing portion and at least a portion of said bracket portion are integrally formed.

25. The document holder of claim 15, wherein the back panel of the shopping cart is receivable between said separable backing plate and said bracket portion of said document holder.

26. The document holder of claim 25, wherein said separable backing plate is fastened to said bracket portion via at least one fastener, said fastener for extending through the back panel of the shopping cart.

27. The document holder of claim 15, wherein said two-piece bracket comprises two or more ramped tabs, said ramped tabs adapted to engage one another and urge said backing plate toward said writing portion.

28. The document holder of claim 15, wherein said backing plate comprises one or more spaced notches and said writing portion comprises one or more spaced ribs, said notches configured to align with said ribs in an interlocking manner when said two-piece bracket is assembled.

29. The document holder of claim 15, further comprising a securing member at said writing portion, and wherein said writing portion comprises a lip at a lower end portion of said writing portion, said lip and at least one of said frame portion and said securing member adapted to retain a sheet at said writing portion.

30. The document holder of claim 15, further in combination with a shopping cart having a back panel.

* * * * *

UNITED STATES PATENT AND TRADEMARK OFFICE
CERTIFICATE OF CORRECTION

| | | |
|---|---|---|
| PATENT NO. | : 7,871,051 B2 | Page 1 of 1 |
| APPLICATION NO. | : 12/237922 | |
| DATED | : January 18, 2011 | |
| INVENTOR(S) | : Amy Youngblood Schuermann et al. | |

It is certified that error appears in the above-identified patent and that said Letters Patent is hereby corrected as shown below:

Column 9
Line 35, "fill-size" should be --full-size--

Signed and Sealed this

Thirty-first Day of May, 2011

David J. Kappos
*Director of the United States Patent and Trademark Office*